United States Patent Office 3,595,893
Patented July 27, 1971

3,595,893
REACTION PRODUCT OF A DIALKYLTIN DIFLUORIDE AND A DIALKYLTIN SULFIDE AND THE PROCESS THEREOF
Arnold Schroeder, Pamontstraat 8, Deventer, Netherlands, and Paulus G. J. Nieuwenhuis, Adelaarslaan 219, Apeldoorn, Netherlands
No Drawing. Original application Oct. 23, 1967, Ser. No. 677,067, now Patent No. 3,522,206, dated July 28, 1970. Divided and this application Aug. 27, 1969, Ser. No. 871,010
Claims priority, application Netherlands, Nov. 9, 1966, 6615781
Int. Cl. C08f 45/62, 7/22
U.S. Cl. 260—429.7                    7 Claims

ABSTRACT OF THE DISCLOSURE

The present invention relates to a process for stabilizing polyvinyl chloride, and other polymers and copolymers which contain halogen, with a reaction product obtained from a dialkyl-tin-difluoride and a dialkyl-tin-sulphide, the reaction product being employed either as such or formed in situ.

---

This application is a division of U.S. application Ser. No. 677,067, filed Oct. 23, 1967, and now U.S. Pat. No. 3,522,206.

BACKGROUND OF THE INVENTION

It is known that polyvinyl chloride and other polymers or copolymers containing halogen (especially chlorine) deteriorate on aging and under the influence of light and/or heat, and this deterioration often results in a discoloration of the polymer or copolymer.

Many substances have already been proposed as additives to polyvinyl chloride and other polymers or copolymers which contain halogen, for the purpose of retarding this deterioration. These additives include soda, lead carbonate, cadmium stearate and other metal acylates, and also organic tin compounds having a tin-sulphur or a tin-oxygen bond, for example dibutyl-tin-bis(laurylmercaptide), dibutyl - tin - bis(isooctylthioglycolate), dibutyl-tin-dilaurate, dibutyl-tin-maleate and dialkyl, diaryl and diaralkyl tin salts of alkyl, aryl and aralkyl monoesters of aliphatic unsaturated dicarboxylic acids.

SUMMARY OF THE INVENTION

It has now been found, in accordance with the present invention, that a reaction product obtained from dialkyl-tin-difluoride and a dialkyl-tin-sulphide is excellently suitable for addition as a stabilizer to polyvinyl chloride and other polymers and copolymers containing chlorine or other halogen.

According to the present invention, a process is provided for stabilizing a halogen-containing polymer or copolymer, which comprises incorporating in the polymer or copolymer a reaction product prepared by heating a dialkyl-tin-difluoride and a dialkyl-tin-sulphide, in which the alkyl groups are the same or different and contain from 1 to 18 carbon atoms each.

The reaction product is preferably prepared at a temperature in the range of about 50° to 220° C., most preferably in the range of about 100° to 200° C.

The good stabilizing effect of the reaction product is provided by the compound present therein having the formula $(alkyl)_4Sn_2SF_2$, the structural formula of which is presumed to be:

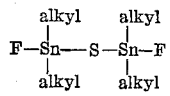

analogous to the corresponding chloro compound described in "Chemische Berichte," 96 (1963), page 3018.

The stabilizing reaction product may be added as such to the polymer or copolymer to be stabilized. However, it may also be formed in situ, such as by the addition of both of the starting materials dialkyl-tin-difluoride and dialkyl-tin-sulphide (in the molar ratio desired) to the polymer or copolymer to be stabilized during the mixing on the roll.

In carrying out the present invention, the dialkyl-tin-difluoride and the dialkyl-tin-sulphide are reacted in a molar ratio in the range from about 1:1 to 1:20. A preferred molar ratio is about 1:4.

The stabilizers according to the present invention may be incorporated into the polymers to be stabilized in quantities of about 0.1 to 5.0% by weight, and preferably about 0.2 to 2% by weight of the polymer.

It is frequently desirable to incorporate into the polymer other organo-tin stabilizers in addition to the stabilizer according to the present invention, for it appears that the effect of known stabilizers, such as dibutyl-tin-dilaurate, dibutyl-tin-bis(lauryl-mercaptide) and dibutyl-tin-bis(mono-2-ethylhexylmaleate), may be considerably improved by the simultaneous use of the reaction products according to the present invention or of the compounds from which such reaction products are formed. Thus, the present invention includes stabilizing compositions for incorporation in polymers and copolymers of the kinds in question, based upon such known organo-tin stabilizers in association with a reaction product or the starting materials for forming a reaction product of the present invention.

As representative examples of such compositions, there may be mentioned compositions containing about 5–20% of dialkyl-tin-difluoride, about 20–60% of dialkyl-tin-sulphide (or the reaction product thereof) and about 20–75% of one of the organo-tin stabilizers already known, for instance a dialkyl-tin-dilaurate, a dialkyl-tin-mercaptide or a dialkyl-tin-derivative of a monoester of an usaturated dicarboxylic acid such as maelic acid.

The stabilizers according to the present invention (or compositions containing those stabilizing agents) may be incorporated into the polymer or copolymer to be stabilized in the usual way, for instance by calendering or on a two-roll mill, if desired in combination with other ingredients selected from the class of anti-oxidants, ultraviolet absorbers, coloring agents, pigments, fillers, plasticizers and lubricants.

DETAILED DESCRIPTION OF PREFERRED EMBODIMENTS

In order that this invention may be readily understood, the following specific examples are set forth. Where in these examples reference is made to color value, this was determined according to the Hazen color scale as described in A.S.T.M. Standards, D1209–52T (1952).

EXAMPLE 1

A sample of a stabilized polyvinyl chloride was prepared. Firstly, on a roll at a temperature of 170°–175° C., 100 parts by weight of a polyvinyl chloride obtained by suspension polymerization, with a K-value of 58–60, available under the trade name "Solvic" 229, were mixed with 0.3 part by weight of a conventional lubricant (O. P. Wachs) and with 0.8 part by weight of a stabilizer. This was obtained by mixing dibutyl-tin-sulphide (DBTS) with dibutyl-tin-difluoride (DBTF) in a molar ratio as mentioned hereafter, and then heating the mixture to 125° C. After mixing, the sample was rolled out to form a sheet with a thickness of approximately 0.5 mm., which was subjected to an oven-test at a temperature of 170° C. The times were determined at which discoloration and browning started.

Comparative experiments were also carried out with stabilizers formed in situ.

The results obtained are tabulated hereafter in Table I.

TABLE I

| | Parts by weight | | | | | | | |
|---|---|---|---|---|---|---|---|---|
| Molar ratio DBTF/ DBTS as reaction product: | | | | | | | | |
| 5/5 | 0.8 | | | | | | | |
| 4/6 | | 0.8 | | | | | | |
| 3/7 | | | 0.8 | | | | | |
| 2/8 | | | | 0.8 | | | | |
| Mixture consisting of: | | | | | | | | |
| DBTF | | | | | 0.4 | 0.24 | 0.16 | 0.08 |
| DBTS | | | | | 0.4 | 0.56 | 0.64 | 0.72 |
| "Solvic" 229 | 100 | 100 | 100 | 100 | 100 | 100 | 100 | 100 |
| Lubricant | 0.3 | 0.3 | 0.3 | 0.3 | 0.3 | 0.3 | 0.3 | 0.3 |
| Discoloration time (mins.) | 50 | 70 | 80 | 90 | 50 | 80 | 90 | 90 |
| Browning time (mins.) | 130 | 130 | 130 | 130 | 130 | 130 | 130 | >130 |

EXAMPLE 2

Three stabilizers were prepared by heating a mixture of 1 mol of dibutyl-tin-difluoride and 1 mol of dibutyl-tin-sulphide; a mixture of 1 mol of dioctyl-tin-difluoride and 1 mol of dioctyl-tin-sulphide; and a mixture of 1 mol of didodecyl-tin-difluoride and 1 mol of didodecyl-tin-sulphide, at a temperature of 120–140° C. These three stabilizers, indicated respectively as A, B and C below, were tested as to their stabilizing capacity with respect to polyvinyl chloride in the way described above in Example 1.

The results obtained are tabulated hereafter in Table II.

TABLE II

| | Parts by weight | | |
|---|---|---|---|
| "Solvic" 229 | 100 | 100 | 100 |
| Lubricant (O.P. Wachs) | 0.3 | 0.3 | 0.3 |
| Stabilizer: | | | |
| A | 1 | | |
| B | | 1 | |
| C | | | 1 |
| Discoloration time (mins.) | 50 | 50 | 50 |
| Browning time (mins.) | 170 | 150 | 130 |

EXAMPLE 3

Samples of stabilized polyvinyl chloride were prepared by mixing on a roll at a temperature of 170°–175° C., 100 parts by weight of a polyvinyl chloride ("Solvic" 229) with 0.3 part by weight of a conventional lubricant (O. P. Wachs) and with 1 part by weight of a stabilizer (A, B, C, 1, D, E, F, 2, G, H, J, 3) of the following compositions, in percent by weight:

TABLE III

| | Percent by weight | | | | |
|---|---|---|---|---|---|
| | Dibutyl-tin-di-(laurate) | Dibutyl-tin-bis (lauryl-mercap-tide) | Dibutyl-tin-bis (mono-2-ethyl-hexyl-maleate) | Dibutyl-tin-sulphide | Dibutyl-tin-di-fluoride |
| Stabilizer: | | | | | |
| A | 25 | | | 60 | 15 |
| B | 45 | | | 40 | 15 |
| C | 70 | | | 20 | 10 |
| 1 | 100 | | | | |
| D | | 25 | | 60 | 15 |
| E | | 45 | | 40 | 15 |
| F | | 70 | | 20 | 10 |
| 2 | | 100 | | | |
| G | | | 25 | 60 | 15 |
| H | | | 45 | 40 | 15 |
| J | | | 70 | 20 | 10 |
| 3 | | | 100 | | |

The samples were rolled out to form sheets with a thickness of approximately 0.5 mm. and then heated in an oven at a constant temperature of 170° C. Every 20 minutes, the thermostability was determined by cutting off a sample from the sheets, pressing the samples between aluminum sheets at a temperature of 170° C. and at a pressure of 10 atm., and subsequently determining the color values.

The color values thus obtained are tabulated hereafter in Table IV.

TABLE IV

| | Color value after the stated time in mins. | | | | | | | | | | |
|---|---|---|---|---|---|---|---|---|---|---|---|
| | 0 | 10 | 30 | 50 | 70 | 90 | 110 | 130 | 150 | 170 | 190 |
| Stabilizer: | | | | | | | | | | | |
| A | 0 | 0 | 0–5 | 0–5 | 5 | 5 | 5 | 5 | 5–10 | 5–10 | 10 |
| B | 0 | 0 | 0–5 | 5 | 5 | 5–10 | 5–10 | 5–10 | 10 | 20 | 60 |
| C | 0–5 | 0–5 | 5 | 5–10 | 5–10 | 5–10 | 5–10 | 15 | 20 | 25 | 35 |
| 1 | 5 | 5–10 | 15–20 | 30 | 60 | 125 | | | | | |
| D | 0 | 0 | 0 | 0–5 | 0–5 | 0–5 | 0–5 | 5 | 5–10 | 5–10 | 5–10 |
| E | 0–5 | 5 | 5 | 5 | 5 | 5–10 | 5–10 | 5–10 | 5–10 | 5–10 | 10–15 |
| F | 5 | 5–10 | 5–10 | 5–10 | 5 | 5 | 5 | 5 | 5–10 | 25 | 30 |
| 2 | 5 | 20 | 25–30 | 20 | 15–20 | 10–15 | 30–35 | 100 | 125 | | |
| G | 0 | 0 | 0 | 0–5 | 0–5 | 0–5 | 0–5 | 5 | 5 | 5–10 | 5–10 |
| H | 0 | 0 | 0 | 0–5 | 0–5 | 0–5 | 5 | 5 | 5–10 | 15 | 35–40 |
| J | 0 | 0 | 0–5 | 0–5 | 0–5 | 5 | 5–10 | 10 | 20 | 40–50 | 60 |
| 3 | 0 | 0–5 | 5 | 5–10 | 10 | 15–20 | 20–25 | 80 | 90 | | |

It will be seen that the compositions prepared according to the present invention gave markedly better results than those using stabilizers 1, 2 and 3, which are not reaction products.

The present invention is not limited to the examples given above, as variations are possible within the scope of the invention, as defined in the appended claims.

What is claimed is:

1. A process for preparing a composition useful as a stabilizer for a halogen-containing polymer or copolymer, which comprises heating a dialkyl-tin-difluoride and a dialkyl-tin-sulphide, in which the alkyl groups are the same or different and each alkyl group contains from 1 to 18 carbon atoms.

2. A process according to claim 1, in which the reaction product is prepared at a temperature in the range of about 50° to 220° C.

3. A process according to claim 2, in which the reaction temperature is in the range of about 100° to 200° C.

4. A process according to claim 3, in which the dialkyl-tin-difluoride and dialkyl-tin-sulphide are reacted in a molar ratio in the range from about 1:1 to 1:20.

5. A process according to claim 4, in which the molar ratio is about 1:4.

6. A process according to claim 1, in which the alkyl groups are butyl or octyl groups.

7. A reaction product useful as a stabilizer for a halogen-containing polymer or copolymer, when prepared by a process according to claim 1.

References Cited

UNITED STATES PATENTS 2,789,105  4/1957  Tomka et al. _____ 260—429.7

OTHER REFERENCES

Neuman, Die Organische Chemie Des Zinns (1967), p. 132, QD1.S2.

JAMES E. POER, Primary Examiner

W. F. W. BELLAMY, Assistant Examiner

U.S. Cl. X.R.

260—45.75

PO-1050
(5/69)

UNITED STATES PATENT OFFICE
CERTIFICATE OF CORRECTION

Patent No. 3,595,893      Dated July 27, 1971

Inventor(s) Arnold SCHROEDER and Paulus G.J. NIEUWENHUIS

It is certified that error appears in the above-identified patent and that said Letters Patent are hereby corrected as shown below:

Column 1, in the heading of the patent,

-- Arnold Schroeder and Paulus G.J. Nieuwenhuis, assignors to KONINKLIJKE INDUSTRIEELE MAATSCHAPPIJ NOURY & VAN DER LANDE N. V., Deventer, The Netherlands, a corporation of the Kingdom of The Netherlands. --

Signed and sealed this 15th day of February 1972.

(SEAL)
Attest:

EDWARD M. FLETCHER, JR.
Attesting Officer

ROBERT GOTTSCHALK
Commissioner of Patents